United States Patent
Krishna Murthy et al.

(10) Patent No.: US 10,969,986 B2
(45) Date of Patent: Apr. 6, 2021

(54) DATA STORAGE SYSTEM WITH STORAGE CONTAINER PAIRING FOR REMOTE REPLICATION

(71) Applicant: EMC IP Holding Company LLC, Hopkinton, MA (US)

(72) Inventors: Sathya Krishna Murthy, Morrisville, NC (US); Dmitry Tylik, Westborough, MA (US); Nagasimha Haravu, Apex, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 218 days.

(21) Appl. No.: 16/179,775

(22) Filed: Nov. 2, 2018

(65) Prior Publication Data

US 2020/0142594 A1 May 7, 2020

(51) Int. Cl.
*G06F 3/06* (2006.01)
*G06F 9/455* (2018.01)

(52) U.S. Cl.
CPC .............. *G06F 3/065* (2013.01); *G06F 3/061* (2013.01); *G06F 3/0604* (2013.01); *G06F 3/067* (2013.01); *G06F 3/0614* (2013.01); *G06F 3/0665* (2013.01); *G06F 9/45558* (2013.01); *G06F 2009/45562* (2013.01)

(58) Field of Classification Search
CPC .. G06F 3/065; G06F 11/1451; G06F 11/2094; G06F 16/27; G06F 11/1458; G06F 11/1469; G06F 3/0647; G06F 3/0665; G06F 11/203; G06F 3/061; G06F 3/0614; G06F 3/0604; G06F 3/067
See application file for complete search history.

(56) References Cited

U.S. PATENT DOCUMENTS

| | | |
|---|---|---|
| 6,601,187 B1 | 7/2003 | Sicola et al. |
| 9,128,626 B2 | 9/2015 | Chacko |
| 9,444,678 B2 | 9/2016 | Clarkson |
| 9,569,235 B1 | 2/2017 | Wang et al. |
| 9,785,523 B2 | 10/2017 | Chiruvolu et al. |
| 2006/0161810 A1 | 7/2006 | Bao |
| 2007/0033355 A1* | 2/2007 | Maki .................. G06F 11/2069 711/162 |
| 2012/0016849 A1* | 1/2012 | Garrod ................. G06F 16/273 707/695 |

(Continued)

*Primary Examiner* — Reginald G Bragdon
*Assistant Examiner* — Thanh D Vo
(74) *Attorney, Agent, or Firm* — BainwoodHuang (57) ABSTRACT

A data storage system in a cluster of storage systems provides virtual-volume data storage to virtual-computing (VC) hosts. A storage container is created for use as a logical grouping of virtual volumes (VVols), and \the storage container is paired as a source storage container with a target storage container on a remote target data storage system. The pairing identifies the target storage container to be used for storing a replica of a replication group of VVols to be stored in the source storage container. When a VVol having a requirement for protection by replication is created, it is placed in a replication group of the source storage container. Subsequently, based on the VVol being a member of the replication group of the source storage container, the VVol is replicated to a target replication group of the target storage container of the remote data storage system.

20 Claims, 5 Drawing Sheets

(56) References Cited

U.S. PATENT DOCUMENTS

| | | | |
|---|---|---|---|
| 2015/0234846 A1* | 8/2015 | Moore | G06F 16/1827 |
| | | | 707/747 |
| 2015/0301900 A1 | 10/2015 | Whitehead et al. | |
| 2016/0004611 A1 | 1/2016 | Lakshman et al. | |
| 2016/0239396 A1* | 8/2016 | Deng | G06F 11/1666 |
| 2018/0225052 A1* | 8/2018 | Rogers | G06F 3/067 |

* cited by examiner

DATA STORAGE SYSTEM WITH STORAGE CONTAINER PAIRING FOR REMOTE REPLICATION

BACKGROUND

The present invention relates to the field of data storage systems providing support for virtualized storage resources, such as virtual volumes, in a virtual-computing environment. In particular, the disclosure is directed to replication of virtual volumes, generally used for data protection.

SUMMARY

Generally the disclosure relates to data storage systems (DSSs) used in a cluster or federation, more specifically DSSs in a federation of highly-available two-node appliances that support block, file and virtual-computing (VC) protocols and operations such as for virtual volumes (VVols) employed in VMware® systems. More specifically, the disclosure is directed to support for replication groups (RGs) for replication and disaster recovery of VVols.

In a disclosed technique, storage container pairing is used in which there is specific definition of which storage container on a target system should be used based on the source storage container for a replication group. The pairing provides a template-like structure for protecting replication groups.

More specifically, a method is disclosed of operating a data storage system in a cluster of storage systems to provide virtual-volume data storage to a plurality of virtual-computing (VC) hosts, the virtual-volume data storage being provided as a logical view of underlying physical data storage on physical storage devices of the data storage system.

The method includes creating a storage container to be used as a logical grouping of virtual volumes (VVols) and derivatives thereof including clones and snapshots, and pairing the storage container as a source storage container with a target storage container on a remote data storage system. The pairing identifies the target storage container to be used for storing a replica of a replication group of VVols to be stored in the source storage container.

In a process of creating a VVol having a requirement for protection by replication, the VVol is placed in a replication group of the source storage container. Subsequently, based on the VVol being a member of the replication group of the source storage container, the VVol is replicated to a target replication group of the target storage container of the remote data storage system.

The disclosed technique may enable the use of general policy profiles not specific to a given target system. Policy can dictate that protection is required, but the details of use of specific target replication groups, for example, are left to the pairing function which is necessarily more system-specific. The pairing technique may also better support complex organization environments where storage and virtualization administrator responsibilities are separated.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Generally the disclosure relates to data storage systems (DSSs) used in a cluster or federation, more specifically DSSs in a federation of highly-available two-node appliances that support block, file and virtual-computing (VC) protocols and operations such as for virtual volumes (VVols) employed in VMware® systems. More specifically, the disclosure is directed to support for replication groups (RGs) for replication and disaster recovery of VVols.

Figure 1:
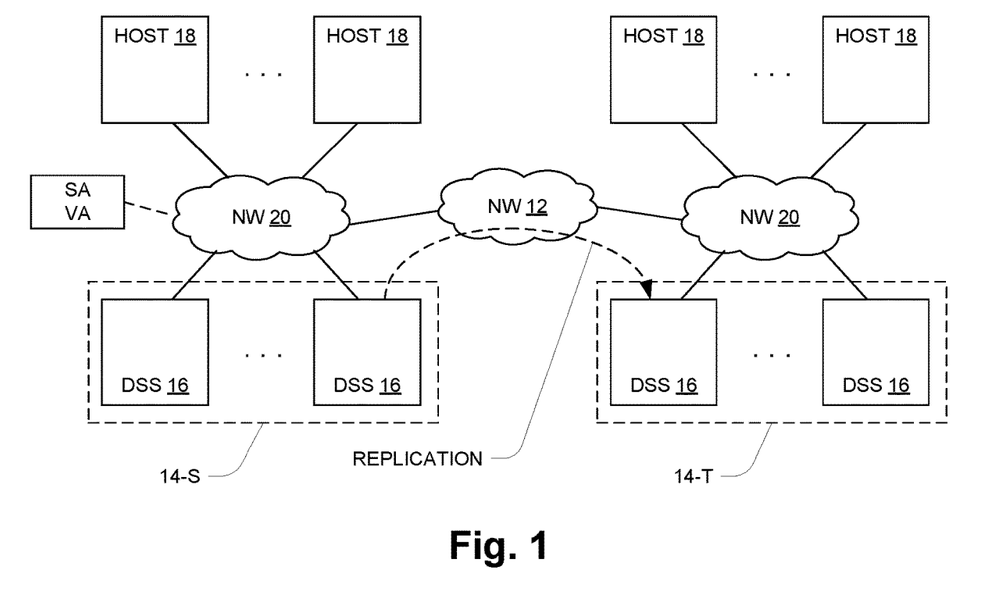
FIG. 1 is a block diagram of a distributed computing system showing replication from a source data storage cluster to a target data storage cluster.

FIG. 1 shows a distributed data processing system including a local system 10-L and a remote system 10-R coupled by a network 12. Each system 10 includes a respective cluster 14 of data storage systems DSSs 16 and a plurality of host computers (hosts) 18 coupled together by a respective local network 20. The cluster 14 of local system 10-L is shown as a source cluster 14-S, and the cluster 14 of remote system 10-R is shown as a target cluster 14-T. These labels refer to source and target participants in replication as described herein. Replication refers to establishing and maintaining a copy of data from one system on another system, as indicated for example by the dashed line in FIG. 1 extending from a DSS 16 of source cluster 14-S to a DSS 16 of target cluster 14-T.

Each system 10 of FIG. 1 also includes either or both a storage administrator SA and/or a virtualization administrator VA, communicatively coupled into the system via the network 20. In operation the SA and/or VA communicate with the hosts 18 and DSSs 16 as described more herein.

As generally known in the art, the hosts 18 include hardware and software resources specially tailored for the host-computer functionality. A compute subsystem includes processors, memory and interface logic enabling a host 18 to execute system-level software such as operating systems, hypervisors, etc. along with user-level applications such as database applications, transaction applications, other server applications, etc. Interface circuitry enabling a host 18 to engage in external data communications including local-area networking, clustering, wide-area networking, etc. In one embodiment the hosts 18 are virtual-computing (VC) servers or hosts executing respective hypervisors and collections of virtual machines (VMs). In some embodiments the VMs may belong to separate organizations which are referred to as "tenants", producing a "multi-tenant" aspect of host configuration and operation. The data storage systems 16 have more specialized organizations tailored to data storage operations specifically, including specialized interface circuitry (e.g., storage-network interfaces), processing circuitry, and physical storage devices (such as disks, Flash memory modules, etc.) enabling a DSS 16 to provide a variety of secondary storage related services. More details regarding the data storage systems 16 are provided below.

Figure 2:
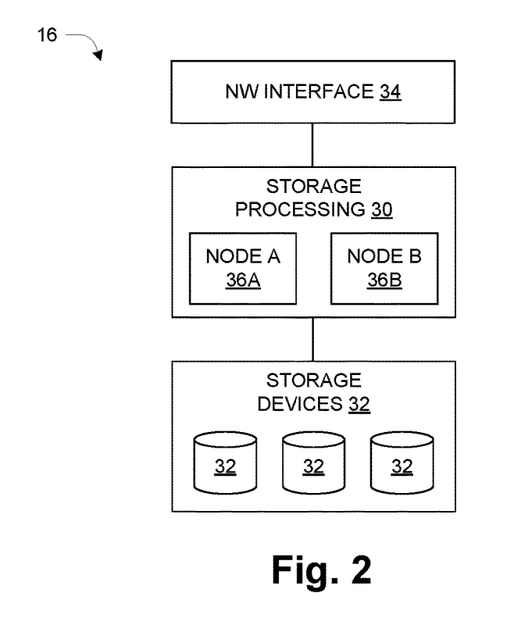
FIG. 2 is a hardware block diagram of a data storage system (DSS)

FIG. 2 is a block diagram of a data storage system 16. It includes storage processing circuitry 30, a set of physical storage devices 32, and interface circuitry 34 for interfacing to the local network 20 (FIG. 1). The storage processing circuitry 30 has two separate processing nodes, shown as an A node 36A and a B node 36B. Each of these is a complete storage processor with software providing all storage-related functionality, for example the handling of incoming storage read and write requests, configuration and maintenance operations, and in particular data and management operations related to virtual volumes (VVols), as briefly mentioned above and described more fully below. In this respect the operating software interacts with corresponding virtual-computing functionality of the hosts 18 as well as with peer storage systems 16.

In one embodiment a collection of DSSs 16 is organized as a cluster 14 to provide increased performance and resiliency, as generally known in the art. Cluster functionality is also implemented in the operating software executed by the nodes 36A, 36B. Additionally, within a given DSS 16 the two nodes 36A, 36B have additional interrelated functionality, for example providing "active-active" redundancy in which (1) in the absence of failures, each node 36 processes a corresponding portion of an overall workload, so there is workload sharing between the two nodes 36A, 36B, and (2) upon failure of one node 36, its workload is automatically transferred to the other node 36, providing for ongoing operation albeit at reduced performance until the failure is corrected or other corrective action is taken.

The description below is directed to operation at a logical layer generally above the physical layer at which data is transferred to and from the physical storage devices 32. As generally known in the art, data storage systems typically create logical abstractions of underlying storage and present these to operating software (e.g., applications, operating systems, hypervisors) to provide certain overall system benefits. For example, the specialized chores of managing the physical storage devices 32 can be contained in the DSSs 16, freeing the hosts 18 and their various operating software (especially applications) from any need to address such details. Block-structed abstractions such as logical units (LUNs) and volumes are generally known. A file system and its collection of user-visible files and directories is also such an abstraction. Such higher-level logical operations are provided by the storage processing 30. The present description is directed to certain specific types of higher-level logical operations, related to virtual volumes (VVols) as described more below.

Figure 3:
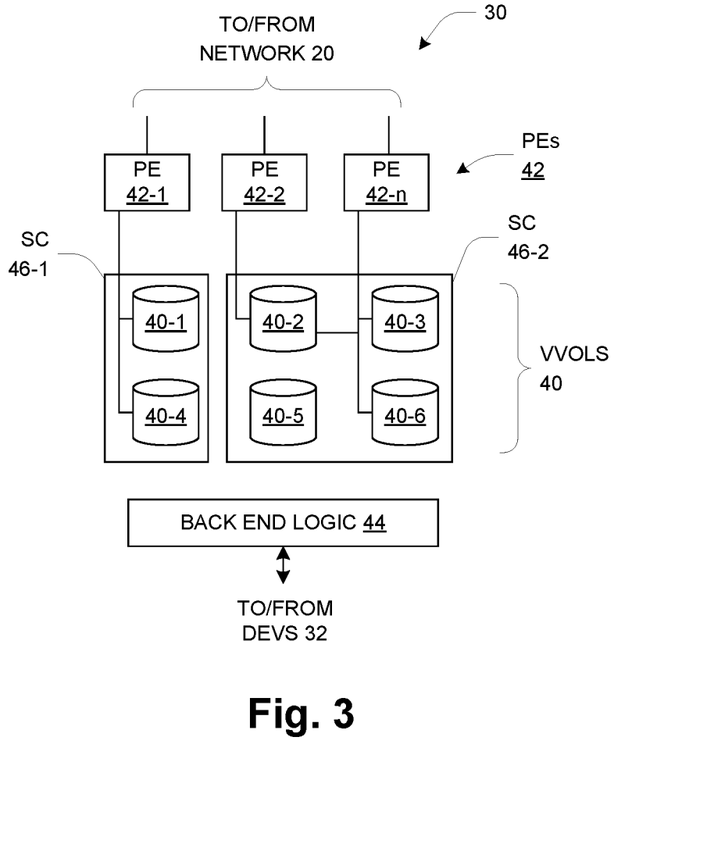
FIG. 3 is a functional block diagram of a DSS showing the use of storage containers for storing virtual volumes (VVols)

FIG. 3 illustrates pertinent logical-layer organization of the storage processing 30. It includes virtual volumes or VVols 40, protocol endpoints or PEs 42, and back end logic 44. The PEs 42 are targets of data storage requests from external requestors (i.e., the hosts 18), and the back end logic 44 provides a translation between operations on the VVols 40 and the underlying physical storage devices 32. Although the operations involved in this translation are generally very involved and complex, they are generally known in the art and not elaborated further herein.

A function of the PEs 42 is to serve as aggregations or conglomerations of VVols 42. This is indicated in FIG. 3 by specific interconnections, e.g., the connection between PE 42-1 and VVols 40-1 and 40-4 for example. This means that PE 42-1 is the access point (for external requestors) for these two VVols. The PEs 42 may be host-specific and thus each aggregates those VVols 40 that are accessed by the corresponding host 18. In some cases a VVol 40 may be accessible to multiple hosts 18, and in that case it is aggregated by multiple PEs 42 accordingly. FIG. 3 shows an example in which VVol 40-2 is aggregated by PE 42-2 (for one corresponding host) and also by PE 42-$n$ (for another corresponding host). An example use case for such shared access is migration of a virtual machine from one physical machine to another.

FIG. 3 also shows another aspect of organization which is the use of storage containers (SCs) 46-1, 46-2 (generally 46). A storage container 46 is a logical grouping of VVols 40 and their derivatives, such as clones and snapshots. A DSS 16 can host multiple SCs 46 that can be leveraged to host virtual machines provisioned for different tenants in an organization IT environment.

Figure 4:
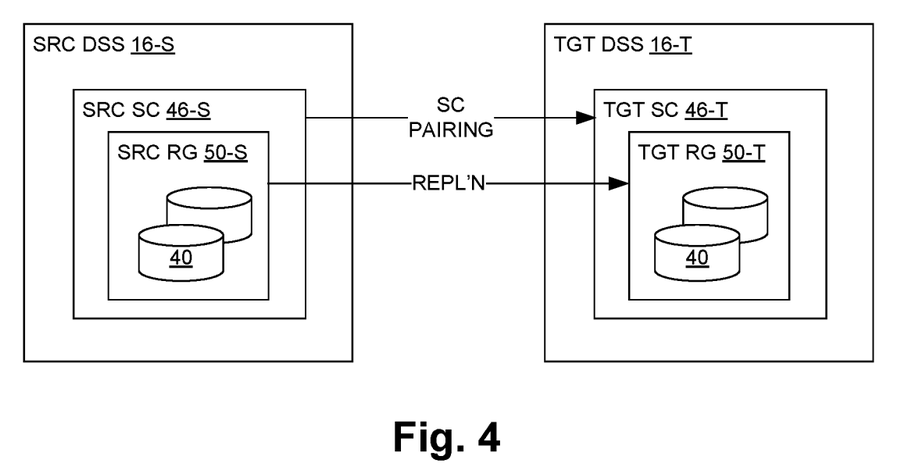
FIG. 4 is a schematic depiction of replication-related structures on source and target DSSs.

FIG. 4 illustrates pairing of SCs 46 in support of replication as described herein. Within each DSS 16, the VVols 40 are additionally organized into replication groups or RGs 50. A replication group 50 is a group of VVols 40 that are protected as one logical entity. All VVols 40 of a replication group 50 are replicated together. Use of replication groups 50 ensures write order consistent protection and replication of the group the VVols 40. The DSSs 16 provide support for creating and managing replication groups 50, either exposing such functionality as a set of management operations for the storage administrator SA (e.g., pre-created replication groups) or based on policy profiles assigned by to virtual machines (e.g., dynamically created replication groups). The DSS 16 also provides support for setting up replication of Replication Groups between source and target storage systems 10. From the perspective of the hosts 18, a replication group 50 should be contained entirely within a single storage container 46. However, there may be no way for a host 18 to specify how replication groups 50 created on a source system 16-S should be reflected on a target system 16-T if the target system 16-T hosts multiple storage containers 46. The disclosed technique is directed to this need to manage such details of replication.

Thus the DSSs 16 implement pairing of storage containers (SCs) 46 as illustrated in FIG. 4. A source storage container 46-S on a source DSS 16-S is paired with a target storage container 46-T on a target DSS 16-T. Using such pairing, the VVols 40 of a source replication group 50-S contained within the source SC 46-S are automatically replicated (by replication REPL'N) to the target SC 46-T, specifically as a target replication group 50-T. The pairing is performed by the DSSs 16 based on commands from the SA (FIG. 1). Storage container pairing defines a directional association (source to target) between SCs 46 on two DSSs. Pairing information identifies the source DSS 16-S, source SC 46-S, target DSS 16-T, and target SC 46-T. When protecting a replication group 50 (e.g., RG 50-S), the pairing information for the hosting SC (e.g., SC 46-S) is used to determine where the target replication group will be placed (e.g., as target 50-T within target SC 46-T).

Figure 5:
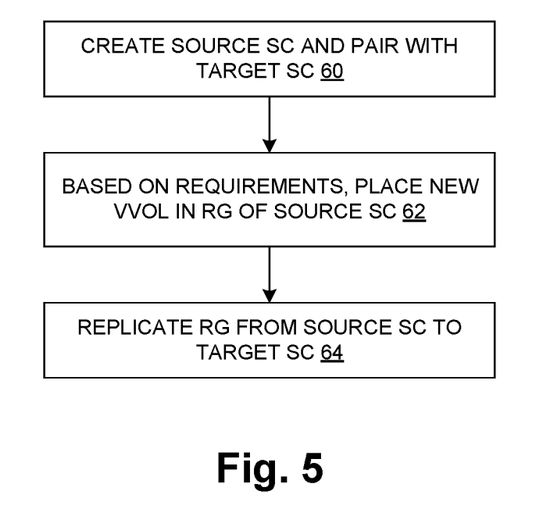
FIG. 5 is a flow diagram of replication-related operation.

FIG. 5 shows pertinent operation at a high level. Additional details are provided below.

At 60, a storage container SC (e.g., 46) is created, serving as a logical grouping of virtual volumes (VVols) and derivatives thereof including clones and snapshots, and the storage container is paired as a source SC with a target SC on a remote data storage system (e.g., 10-R). The pairing identifies the target storage container to be used for storing a replica of a replication group (e.g., 50) of VVols to be stored in the source SC.

At 62, in a process of creating a VVol (more below) having a requirement for protection by replication, the VVol is placed in a replication group of the source SC.

At 64, based on the VVol being a member of the replication group of the source SC, the VVol is subsequently replicated to a target replication group of the target SC of the remote data storage system. Although this description refers to one VVol, in general a replication group contains multiple VVols, and each VVol of the replication group is replicated to corresponding replicas in the target replication group. In replication, there is typically an initial "synchronization" phase that makes a replica identical to its original, which may take considerable time. This is followed by ongoing incremental copying of data updates (writes and deletes) to maintain close synchronization.

In the pairing and replication processes, certain additional specifics may be employed as follows:

1. When creating a VVol, a host 18 queries a source DSS 16-S for "qualifying" storage containers 46 for creating a VVol 40 having a policy profile requiring that the VVol be protected by replication. In one embodiment this query may be realized using a queryMatchingContainer API command.

2. The source DSS 16-S returns a list of storage containers that are paired with respective target storage containers and qualify for the specified policy profile.

3. Once the administrator selects a storage container, the VVol is created and then is placed in an existing source replication group 50-S, if one exists, or a new source replication group 50-S is created and the VVol 40 placed therein.

4. The source replication group 50-S is then replicated to the target SC 46-T on the target DSS 16-T.

If a replication group is failed over to the target DSS 16-T (planned or unplanned failover), all replicated VVols are created in the destination SC 46-T paired with the source SC 46-S and are made available to the host operating software to re-create the associated virtual machine.

Figure 6:
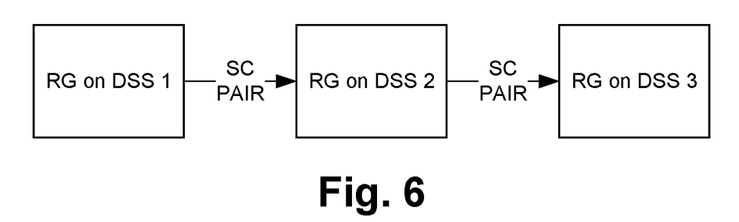
FIGS. 6-8 show use cases for the disclosed techniques including cascading replication, re-protect, and one-to-many replication.
Figure 7:
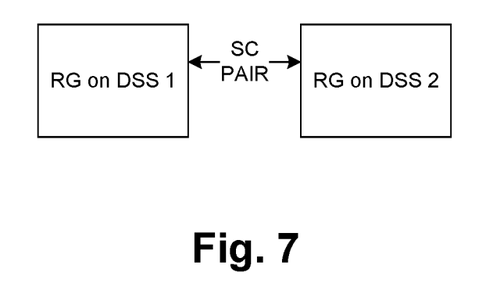
Figure 8:
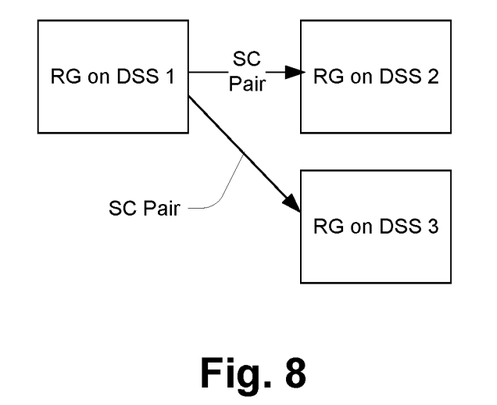

FIGS. 6-8 show use cases for the disclosed techniques including cascading replication, re-protection, and one-to-many replication. Cascading refers to a target SC serving as a source for an entirely different pairing. This is shown in FIG. 6, in which a replication group on DSS 2 serves as a target for DSS 1 and as a source for DSS 3. Re-protection refers to performing a replication in the reverse direction, from an erstwhile target DSS back to an erstwhile source DSS. This is illustrated in FIG. 7, showing a re-protection from DSS 2 to DSS 1. If a replication group is re-protected by initiating the replication in reverse direction, the original VVols may be used as replicas, so there is no need for additional storage container pairing on re-protect. Finally, FIG. 8 illustrates that separate pairing relationships can be established between a source storage container (on DSS 1) and two or more target storage containers (on DSS 2 and DSS 3), providing one-to-many replication such as may be used for enhanced protection, for example.

Because storage container pairing is established from a source DSS 16-S, a monitoring component may be used that periodically checks the presence of the target SC 46-T and the network state between the source DSS 16-S and the target DSS 16-T. The storage administrator may be notified if network communications is broken or the target SC 46-T has been deleted, so the configuration can be repaired.

Storage container pairing is primarily used for placement of replica VVols. Once replication sessions are established at the replication group level, the actual replication operations such as failover are handled at a separate session level. The pairing relationship is no longer needed once the replication sessions are established, and thus pairing may be reconfigured or removed without having an impact on such sessions.

Figure 9:
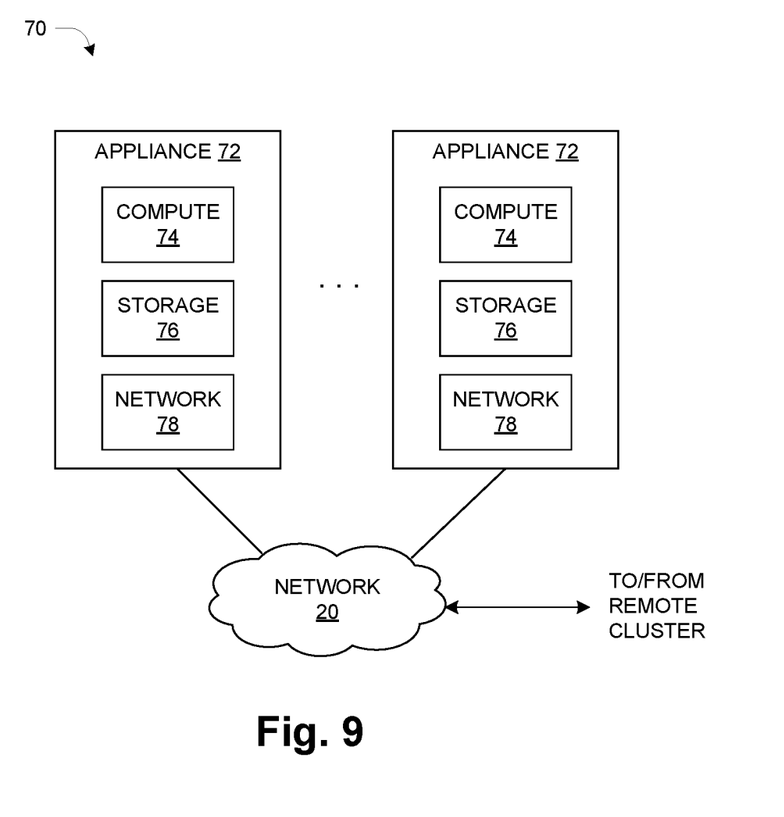
FIG. 9 shows an example of a converged system, an alternative to the non-converged system of FIG. 1.

FIG. 9 shows an example of a system 70 having an alternative configuration, generally referred to as "converged", in which the separate functionalities of the hosts 18 and DSSs 16 of FIG. 1 are realized in respective subsystems of converged appliances 72. These subsystems are shown as a computer subsystem 74, storage subsystem 76, and network subsystem 78. A storage subsystem 76 is still constituted and organized in a manner similar to a DSS 16 as described with reference to FIG. 2, albeit based on sharing certain resources of the appliance 72 with the other subsystems 74, 78. In the system of FIG. 9, the storage subsystems 76 may still be organized as a cluster as in the system of FIG. 1. This means, among other things, that the storage subsystems 76 include functionality for maintaining operation in the event of failure of an appliance 72.

While various embodiments of the invention have been particularly shown and described, it will be understood by those skilled in the art that various changes in form and details may be made therein without departing from the scope of the invention as defined by the appended claims.

What is claimed is:

1. A method of operating a data storage system in a cluster of storage systems to provide virtual-volume data storage to a plurality of virtual-computing (VC) hosts, the virtual-volume data storage being provided as a logical view of underlying physical data storage on physical storage devices of the data storage system, the method comprising:

creating a storage container to be used as a logical grouping of virtual volumes (VVols) and derivatives thereof including clones and snapshots;

pairing the storage container as a source storage container with a target storage container on a remote data storage system, the pairing identifying the target storage container to be used for storing a replica of a replication group of VVols to be stored in the source storage container;

in a process of creating a VVol having a requirement for protection by replication, placing the VVol in a replication group of the source storage container;

based on the VVol being a member of the replication group of the source storage container, subsequently replicating the VVol to a target replication group of the target storage container of the remote data storage system, by a host as part of creating a VVol, querying the data storage system for qualifying storage containers for creating a VVol having a policy profile requiring that the VVol be protected by replication, and by the data storage system in response to the querying, returning a list of existing storage containers that are paired with respective target storage containers and qualify for the specified policy profile.

2. The method of claim 1, wherein each replication group is a respective group of VVols that are protected as one logical entity and replicated together.

3. The method of claim 2, wherein the data storage system provides support for creating and managing replication groups either by exposing replication group functionality as a set of management operations for a storage administrator or based on policy profiles assigned to virtual machines.

4. The method of claim 3, wherein exposing replication group functionality includes exposing pre-created replication groups.

5. The method of claim 1, creating and managing replication groups based on policy profiles includes dynamically creating replication groups throughout operation of the data storage system.

6. The method of claim 1, wherein each replication group is contained entirely within a single storage container.

7. The method of claim 1, wherein the pairing of storage containers is performed by the data storage system based on commands from a storage administrator.

8. The method of claim 1, wherein the pairing of storage containers defines a directional association from source to target between respective storage containers on separate data storage systems, each pairing including pairing information that identifies a source data storage system, a source storage container, a target data storage system, and a target storage container, the pairing information being used by the source data storage system to determine where the target replication group is to be placed.

9. The method of claim 1, wherein the querying is performed using a queryMatchingContainer API command.

10. The method of claim 7, wherein upon the storage administrator selecting a storage container, the VVol is created and then is placed in an existing source replication group of the selected storage container, if one exists, or a new source replication group is created and the VVol placed therein.

11. The method of claim 1, wherein, upon a replication group being failed over to the remote data storage system in either a planned or unplanned failover, all replicated VVols are created in the target storage container and are made available to host operating software to re-create an associated virtual machine.

12. The method of claim 1, wherein the replication includes cascading replication in which the target storage container serves as a source storage container for a separate pairing.

13. The method of claim 1, wherein the replication includes re-protection in which reverse-direction replication occurs between the remote data storage system as a source and the data storage system as a target.

14. The method of claim 1, wherein the replication includes use of separate pairing relationships between the source storage container and two or more target storage containers on respective other data storage systems, providing one-to-many replication.

15. The method of claim 1, further including use of a monitoring component that periodically checks for presence of the target storage container and for operational network state between the data storage system and the remote data storage system.

16. A method of operating a data storage system in a cluster of storage systems to provide virtual-volume data storage to a plurality of virtual-computing (VC) hosts, the virtual-volume data storage being provided as a logical view of underlying physical data storage on physical storage devices of the data storage system, the method comprising:

creating a storage container to be used as a logical grouping of virtual volumes (VVols) and derivatives thereof including clones and snapshots;

pairing the storage container as a source storage container with a target storage container on a remote data storage system, the pairing identifying the target storage container to be used for storing a replica of a replication group of VVols to be stored in the source storage container;

in a process of creating a VVol having a requirement for protection by replication, placing the VVol in a replication group of the source storage container; and based on the VVol being a member of the replication group of the source storage container, subsequently replicating the VVol to a target replication group of the target storage container of the remote data storage system, wherein replication sessions are established at a replication group level while actual replication operations including failover are handled at a separate session level, and the pairing is reconfigured or removed once the replication sessions are established.

17. A data storage system for use in a cluster of storage systems to provide virtual-volume data storage to a plurality of virtual-computing (VC) hosts, the virtual-volume data storage being provided as a logical view of underlying physical data storage on physical storage devices of the data storage system, the data storage system including storage devices providing physical data storage, interface circuitry, and storage processing circuitry, the storage processing circuitry being configured and operative to execute computer program instructions causing the data storage system to perform a method including:

creating a storage container to be used as a logical grouping of virtual volumes (VVols) and derivatives thereof including clones and snapshots;

pairing the storage container as a source storage container with a target storage container on a remote data storage system, the pairing identifying the target storage container to be used for storing a replica of a replication group of VVols to be stored in the source storage container;

in a process of creating a VVol having a requirement for protection by replication, placing the VVol in a replication group of the source storage container;

based on the VVol being a member of the replication group of the source storage container, subsequently replicating the VVol to a target replication group of the target storage container of the remote data storage system, by a host as part of creating a VVol, querying the data storage system for qualifying storage containers for creating a VVol having a policy profile requiring that the VVol be protected by replication, and by the data storage system in response to the querying, returning a list of existing storage containers that are paired with respective target storage containers and qualify for the specified policy profile.

18. The data storage system of claim 17, wherein each replication group is a respective group of VVols that are protected as one logical entity and replicated together.

19. The data storage system of claim 18, wherein the data storage system provides support for creating and managing replication groups either by exposing replication group functionality as a set of management operations for a storage administrator or based on policy profiles assigned to virtual machines.

20. The data storage system of claim 17, wherein the pairing of storage containers is performed by the data storage system based on commands from a storage administrator, and wherein, upon the storage administrator selecting a storage container, the VVol is created and then is placed in an existing source replication group of the selected storage container, if one exists, or a new source replication group is created and the VVol placed therein.

* * * * *